United States Patent
Asghar et al.

(10) Patent No.: US 6,212,551 B1
(45) Date of Patent: *Apr. 3, 2001

(54) DIGITIZED AUDIO DATA ATTACHMENT TO TEXT MESSAGE FOR ELECTRONIC MAIL

(75) Inventors: Safdar M. Asghar, Austin; Gerald D. Champagne, Buda, both of TX (US)

(73) Assignee: Advanced Micro Devices, Inc., Sunnyvale, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/929,056

(22) Filed: Sep. 15, 1997

(51) Int. Cl.[7] .......................... G06F 15/16; G06F 15/17; G06F 13/38
(52) U.S. Cl. .......................... 709/206; 709/207; 709/231
(58) Field of Search ................................ 709/203, 206, 709/207, 218, 223, 246, 247, 231; 707/10

(56) References Cited

U.S. PATENT DOCUMENTS

| | | | |
|---|---|---|---|
| 5,227,876 | * | 7/1993 | Cucchi et al. ........................ 370/235 |
| 5,351,276 | * | 9/1994 | Doll, Jr. et al. ................... 379/88.17 |
| 5,377,997 | * | 1/1995 | Wilden et al. ......................... 273/434 |
| 5,548,753 | * | 8/1996 | Linstead et al. .......................... 707/1 |
| 5,594,498 | * | 1/1997 | Fraley .................................. 348/158 |
| 5,647,002 | * | 7/1997 | Brunson .................................. 380/49 |
| 5,699,089 | * | 12/1997 | Murray ................................ 345/146 |
| 5,732,216 | * | 3/1998 | Logan et al. ..................... 395/200.57 |
| 5,793,980 | * | 8/1998 | Glaser et al. ........................... 709/231 |
| 5,799,273 | * | 8/1998 | Mitchell et al. ................. 395/200.53 |
| 5,802,294 | * | 9/1998 | Ludwig et al. .................. 395/200.68 |
| 5,802,314 | * | 9/1998 | Tullis et al. ........................... 709/246 |
| 5,819,032 | * | 10/1998 | De Vries et al. ................ 395/200.47 |
| 5,825,854 | * | 10/1998 | Larson et al. ...................... 379/88.14 |
| 5,832,208 | * | 11/1998 | Chen et al. ...................... 395/187.01 |
| 5,838,685 | * | 11/1998 | Hochman .............................. 370/428 |
| 5,841,979 | * | 11/1998 | Schulhof et al. ............... 395/200.67 |
| 5,870,548 | * | 2/1999 | Nielsen ................................ 709/206 |
| 5,915,091 | * | 6/1999 | Ludwig et al. ....................... 370/265 |
| 5,951,638 | * | 9/1999 | Hoss et al. ........................... 709/206 |
| 5,951,646 | * | 9/1999 | Brandon .............................. 709/231 |
| 5,996,006 | * | 11/1999 | Speicher .............................. 709/218 |
| 5,999,985 | * | 12/1999 | Sebestyen ............................ 709/247 |
| 6,122,668 | * | 9/2000 | Teng et al. ........................... 709/231 |

OTHER PUBLICATIONS

Freed et al., "MIME Part Five: Conformance Criteria and Examples", RFC 2049, pp. 1–24, Nov. 1996.*

Palme et al., "MIME Email Encapsulation of Aggregate Documents", RFC 2110, pp. 1–19, Mar. 1997.*

Freed et al. "MIME Part One: Format of Internet Message Bodies", RFC 2045, pp. 1–31, Nov. 1996.*

Freed et al "MIME Part Two: Media Types", RFC 2046, pp. 1–44, Nov. 1996.*

Moore, K., "MIME Part Three: Message Header Extensions for Non–ASCII Text", RFC 2047, pp. 1–15, Nov. 1996.*

Freed et al., "MIME Part Four: Registration Procedures", RFC 2048, pp. 1–21, Nov. 1996.*

(List continued on next page.)

Primary Examiner—Mark Rinehart
Assistant Examiner—Jason D. Cardone
(74) Attorney, Agent, or Firm—Foley & Lardner

(57) ABSTRACT

A method of communicating via an electronic mail system includes creating a text portion of a message. An audio portion of the message is also recorded. The audio portion is digitized. The digitized audio portion is coupled to the text portion to form a complete message. The complete message is transmitted via the electronic mail system. The complete message is received at a destination unit, which provides for the visual displaying of the text portion of the message, together with the audio outputting of the audio portion of the message.

3 Claims, 2 Drawing Sheets

OTHER PUBLICATIONS

Wener et al., "Encycolopedia of Networking", ISBN 0–7821–1829–1, pp. 264 (Digital Communicaiton), 322–325 (E–mail), and 604–607 (MIME), 1996.*

Stallings, "Data and Computer Communications", ISBN 0–02–415425–3, pp. 115–117 (Analog–to–Digital Signals) and 704–713 (MIME), 1997.*

* cited by examiner

DIGITIZED AUDIO DATA ATTACHMENT TO TEXT MESSAGE FOR ELECTRONIC MAIL

BACKGROUND OF THE INVENTION

1. Field of the Invention

The present invention relates to an apparatus and method for sending audio data with text data as a single message to another location. In particular, the present invention relates to sending, via an e-mail system, a recorded audio portion of a message together with a text data portion of the message.

2. Description of the Related Art

Current e-mail systems allow for the sending and receiving of text data between different locations. However, such systems do not provide a convenient way to send an audio message together with text data.

SUMMARY OF THE INVENTION

It is an object of the invention to allow for sending and receiving of messages between sites, with the messages including both text data and an audio message.

The above-mentioned object and other objects may be accomplished by a method of communicating via an electronic mail system. The method includes a step of creating a text portion of a message. The method also includes a step of recording an audio portion of the message. The method further includes a step of digitizing the audio portion. The method still further includes a step of coupling the digitized audio portion to the text portion to form a complete message. The method also includes the step of transmitting the complete message via the electronic mail system.

The above-mentioned object and other objects may also be accomplished by a method of communicating via an electronic mail system. The method includes a step of receiving a complete message from the electronic mail system. The method also includes a step of decoupling an audio portion of a message and a text portion of the message from the complete message. The method further includes a step of converting the audio portion to analog form. The method still further includes a step of displaying the text portion. The method also includes a step of broadcasting the audio portion.

The above-mentioned object and other objects may also be accomplished by an input device for an electronic mail system. The input device includes a text input unit and an audio input unit. The input device also includes a recording unit connected to the audio input unit for receiving an audio portion of a message from the audio input unit and recording the audio portion. The input device further includes a digitizing unit connected to the recording unit for digitizing the audio portion. The input device still further includes a first storage unit connected to the digitizing unit for storing the digitized audio portion. The input device also includes a second storage unit connected to the text input unit for storing a text portion of the message received from the text input unit. The input device also includes a coupling unit connected to the first and second storage units for receiving the digitized audio portion and the text portion and coupling the digitized audio portion and text portion into a complete message. The input device further includes a transmitting unit connected to the coupling unit for transmitting the complete message.

The above-mentioned object and other objects may also be accomplished by an output device for an electronic mail system. The output device includes a receiving unit for receiving a complete message from the electronic mail system. The output device also includes a decoupling unit connected to the receiving unit for receiving the complete message and decoupling a digitized audio portion and a text portion from the complete message. The output device further includes a first storage unit connected to the decoupling unit for storing the digitized audio portion. The output device still further includes a second storage unit connected to the decoupling unit for storing the text portion. The output device even still further includes a converting unit connected to the first storage unit for converting the digitized audio portion to an analog audio portion. The output device also includes an audio output unit connected to the converting unit for receiving the analog audio portion and broadcasting audio corresponding to the analog audio portion. The output device further includes a display unit connected to the second storage unit for displaying the text portion.

BRIEF DESCRIPTION OF THE DRAWINGS

The above-mentioned objects and advantages of the invention will become more fully apparent from the following detailed description when read in conjunction with the accompanying drawings with like reference numerals indicating corresponding parts throughout, and wherein.

DETAILED DESCRIPTION OF THE PREFERRED EMBODIMENTS

Figure 1:
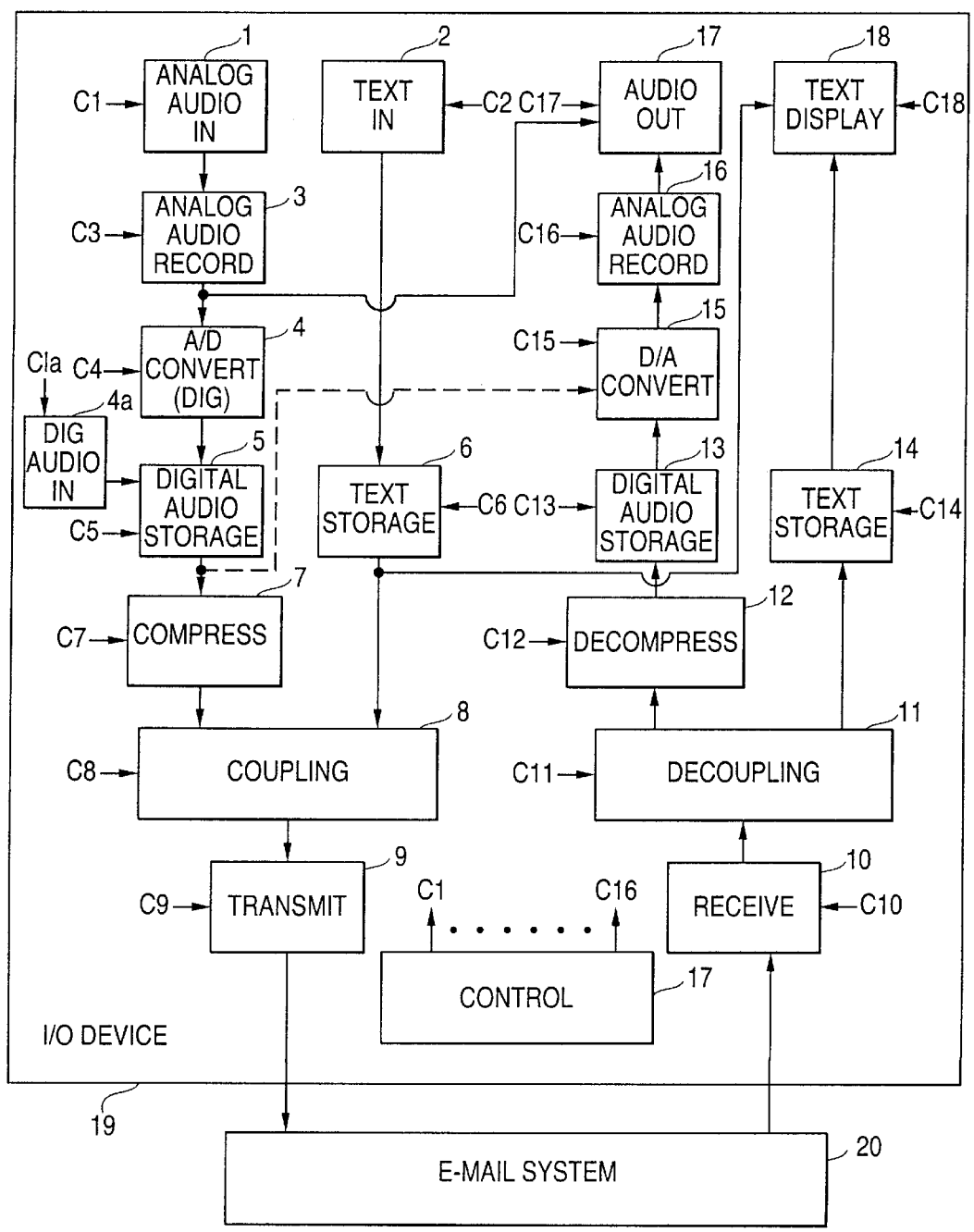
FIG. 1 illustrates an Input/Output Device according to the present invention.

A detailed description of the present invention will be made with reference to FIGS. 1–4. FIG. 1 shows an I/O device 19 according to a preferred embodiment of the invention. I/O device 19 is communicatively connected to e-mail system 20 by either a wired or wireless communications channel. E-mail system 20 may be a cc:mail system, a Lotus Notes system, or other type of electronic mail system, as is known to one of ordinary skill in the art.

Text of a message may be entered via a keyboard (not shown) of a computer (not shown) that is connected to text input unit 2. Precomposed text may also be employed, and is input to text input unit 2 by a floppy disk, magnetic tape, any other conventional data storage medium, or by optically scanning a text document. Of course, the text data that is input to text input unit 2 may include a portion that is precomposed text, and a portion that is keyboard-entered text.

Alternatively, a graphics input function may also be provided at text input unit 2 by a scanner having a graphics scanning capability, or by a computer with a computer-aided graphics design capability or a sketch pad capability. The text message may include a graphics portion or consist entirely of a graphics message. A video input function may further be provided at text input unit 2 to receive video data.

Text input unit 2 is coupled to text storage unit 6, which stores the text data in the system. Text storage unit 6 may be implemented as a Random Access Memory (RAM), for example. Text storage unit 6 is coupled to text display unit 18, which provides visual review of the text data. The visually displayed text data may be revised by use of the computer keyboard at text input unit 2.

An audio message to be appended to the text message is input to audio input unit 1, which may comprise a microphone system, a SoundBlaster™ card, or the like. The audio message also may be pre-composed and pre-recorded, in which case the pre-recorded audio message is also input at audio input unit 1, which can respond to a recorded format, such as an audio or cassette tape.

Audio input unit 1 outputs the audio message to analog audio recording unit 3. Analog recording unit 3 stores the audio message in analog format in the system. Analog recording unit 3 may be implemented as a cassette tape, for example.

Recording unit 3 is also coupled to audio output unit 17, which provides for playback to enable revision of the audio message by using the microphone system of analog audio input unit 1.

Recording unit 3 is coupled to analog-to-digital converter unit 4, which digitizes the message stored in analog format. The conversion rate of analog-to-digital converter 4 must be sufficient in order to meet the Nyquist criterion. For example, 8 kHz is a typically-utilized sampling rate for telephonic systems, which output speech within a range of from 300 Hz to 3500 Hz. Analog to digital converter unit 4 is coupled to digital audio storage unit 5, which provides digital format storage of the audio message in the system. Digital audio storage unit 5 may be implemented as a RAM, for example.

If the pre-composed audio message is already available in digitized format, such as being on a digital tape or compact disk, etc., the audio message may be directly input to digital audio input unit 1a. Digital audio input unit 1a is coupled to digital audio storage 5, which stores the digitized audio data.

Digital audio storage unit 5 is also coupled (as shown by the dashed line in FIG. 1) to digital to analog conversion unit 15, so that the stored digitized audio message may be placed in analog audio format, stored in recording unit 16, and reviewed at audio output unit 17 for possible revision and/or updating.

The digitized audio data is compressed at compression unit 7, and coupled to the text data output from text storage 6 at coupling unit 8. One of ordinary skill in the art will recognize that any number of known data compression techniques may be utilized by compression unit 7 in order to compress the amount of digital data representative of the audio input. Compression unit 7 may provide for removal of any silence in the audio portion, and may provide encoding without removal of silence, by using Manchester encoding, for example.

Coupling unit 8 appends the compressed digitized audio data to the text data, either at the beginning or the end of the text data. The choice of where to append the digitized audio data may be predetermined, or may be user-selectable based on the particular message to be sent. Coupling unit 8 also provides an indication of where in the coupled data the digitized audio data exists, and where in the coupled data the text data exists. This may be accomplished, for example, by either providing an indication of the bit length of the text data and the digitized audio data (as well as which one appears first in the coupled message), or by providing a special "mark" in the coupled message (i.e., special bit pattern) that indicates a transition from digitized audio data to text data, or vice versa.

The coupled data is output by transmit unit 9, via a wired or wireless communications path. The transmitted data output by transmit unit 9 is received by E-mail system 20, which sends the data to the appropriate destination address. The destination address may be determined, for example, based on information stored in a header portion of the transmit data. For example, if the transmit data is sent out as packets of data, each packet has a header field, whereby the destination location information may be stored. Even if packets are not used, each message will contain a header portion, which includes information defining the length (in bits) of the text data portion and/or the digitized audio portion.

E-mail system 20 may be part of a local area network (LAN), wide area network (WAN), Intranet, or Internet, so as to provide connectivity with a plurality of different users. E-mail system 20 transmits and receives data to and from I/O device 19 via a wired or wireless communications channel, depending upon the specific implementation of the network making up the I/O device 19 and the E-Mail system 20.

Data is received from e-mail system 20 at receive unit 10. The receive data is decoupled at decoupling unit 11, which separates the text portion of the receive data from the non-text digitized audio portion of the receive data. The means for performing the decoupling may be performed by a variety of different methods, such as searching for a particular bit pattern indicative of a border between the text data and the non-text digitized audio data, or by reading the header information in a received message so as to determine how many bits of the message are text data and how many bits of the received message are digitized audio data.

Decompression unit 12 performs a decompression of the digitized audio portion of the receive data, using a decompression technique that is similar, but functionally inverse to, the compression technique performed by compression unit 7 (e.g., Manchester decoding). Digital audio storage unit 13 stores the decompressed digitized audio data. Digital audio storage unit 13 may be implemented as a RAM, for example. D/A converter unit 15 converts the decompressed data to analog format. Recording unit 16 stores the received audio message in analog format in the system, and can be implemented as a cassette tape, for example.

Analog audio recording unit 16 is coupled to audio output unit 17 for playback to an operator. Audio output unit 17 may be implemented as an audio speaker and/or a Soundblaster card™, for example. The text portion of the received data is output to text storage unit 14, which stores the text data in digitized format. Text storage unit 14 may be implemented as a RAM, for example. The stored text data is output to text display 18, for display of the text data to an operator. By this configuration, the operator is able to see the (graphics or video) text data, as well as hear the audio portion appended to the text data. The audio/visual output of the received data may be performed consecutively or concurrently, depending upon operator-selection.

Control unit 17 provides the sequential control for the I/O device 17, so as to allow for transmitting and receiving e-mail messages which include text data portions and digitized audio portions. As shown in FIG. 1, control unit 17 provides control signals C1, . . . , C17 to the various elements of I/O device 19, in order to provide for reception and transmission of messages to and from e-mail system 20. Control unit 17 allows for concurrent reception and transmission of messages to and from e-mail system 20, in a case where there is a separate transmission path and reception path between I/O device 17 and e-mail system 20 (i.e., separate transmit and receive carrier frequencies for over-the-air communications between these two devices).

Figure 2:
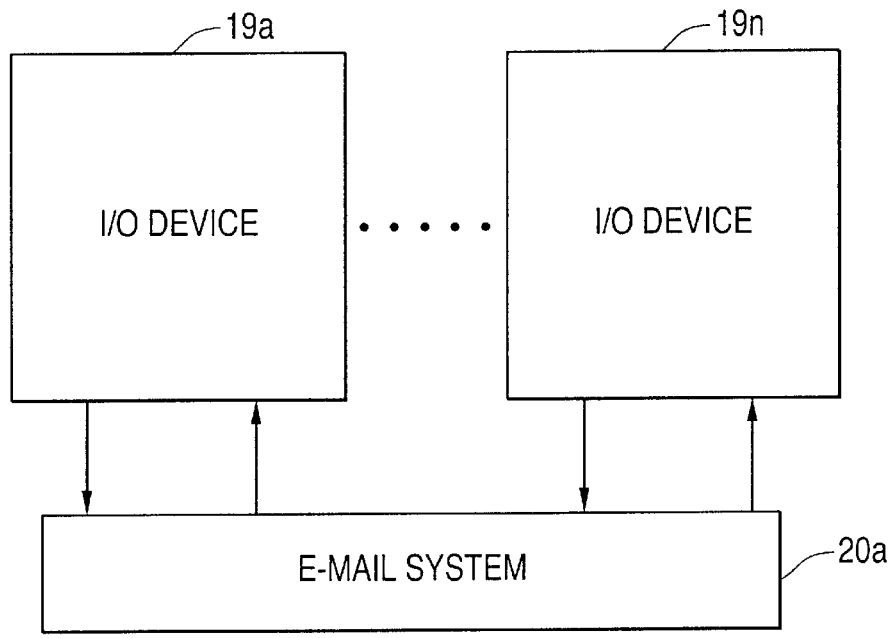
FIG. 2 illustrates a connection of a plurality of Input/Output Devices to an E-Mail System, according to the present invention.

FIG. 2 shows a configuration of I/O Devices 19a, ..., 19m of the system according to the invention. Each I/O Device 19a, ..., 19m is communicatively connected to e-mail system 20a. In the system of FIG. 2, I/O Devices 19a, ..., 19m send text messages with appended (to the front or the back) digitized audio messages, via e-mail messages routed through e-mail system 20a. The messages are not sent in real time, but are instead send in a store-and-forward manner to their respective destinations via e-mail system 20a.

Figure 3:
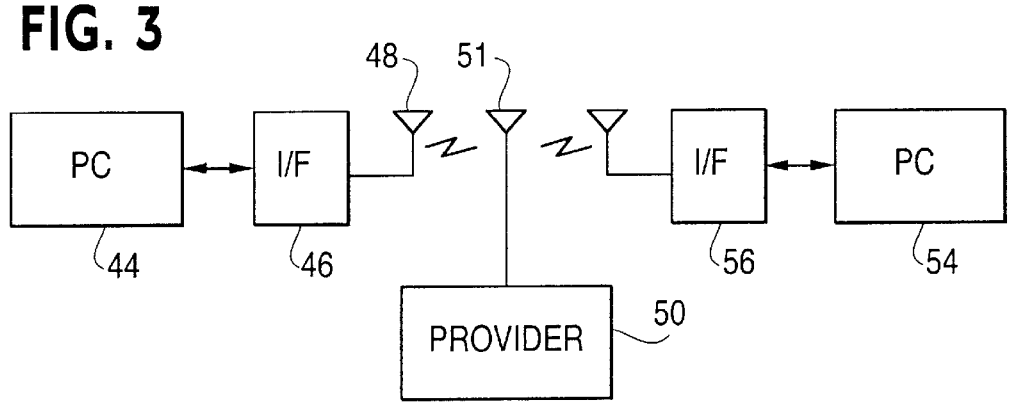
FIG. 3 illustrates a wireless connection of PCs to a Provider, in order to allow for the sending and receiving of text data together with audio messages, according to one embodiment of the present invention.

FIG. 3 shows another configuration for sending text data/digitized audio data between devices, according to the invention. In FIG. 3, PC 44 is connected via interface 46 to transmit/receive device 48. Transmit/receive device 48 may be implemented as an antenna, such as a dipole or loop antenna. Transmit/receive device 48 allow for the transmission and reception of messages over-the-air within a particular frequency range, such as the radio frequency (rf) range. Provider 50 receives and transmits messages to PC 44 via a wireless channel, with messages sent from provider 50 being received by transmit/receive device 48 and then forwarded to interface 46. provider 50 includes an antenna 51 for receiving the messages over-the-air.

Interface 46 performs the necessary "receive" processing on the receive data (e.g., demodulation, decoding, etc.), and outputs the processed data to PC 44. The text data portion of the receive message can then be displayed on a monitor (not shown) of the PC 44, with the audio portion being either sequentially or simultaneously output (via a speaker or the like connected to PC 44) to an operator. PC 54 has an interface 56 for sending and receiving messages containing text data and digitized audio data to and from PC 44, through provider 50.

Figure 4:
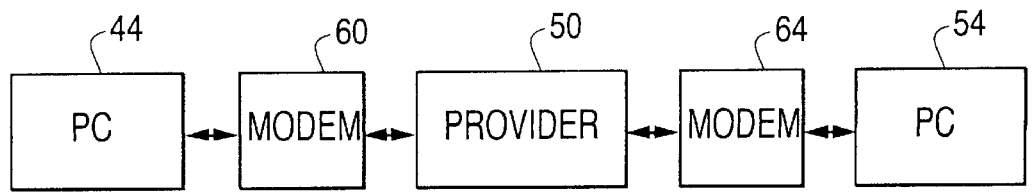
FIG. 4 illustrates a wired connection of PCs to a Provider, via Modems, in order to allow for the sending and receiving of text data together with audio messages, according to another embodiment of the present invention.

FIG. 4 shows a wired configuration for sending messages between devices according to another embodiment of the invention, in which the messages include text data as well as digitized audio data. In FIG. 4, modems 60, 64 replace the interface Units 46, 56 of FIG. 3, and provide a wired connectivity to provider 50. For example, modems 60, 64 may be connected to provider 50 via a Public Switched Telephone Network (PSTN), and may provide a conversion of the text data and the digitized audio data over the PSTN in one of several possible formats, such as the ITU V.34 data communications standard. The connection between modems 60, 64 and provider 50 may be either an analog line or a digital line (i.e., ISDN).

The system according to the invention provides a way to send and receive an audio file, such as one stored in a 3½" floppy disk, as part of a data file to a destination location, via a wired or wireless communications channel. The service for providing the connection to the destination location may be a LAN, a WAN, an Intranet, an Internet, or any other type of networking system.

The messages may be transferred between the Interface units and the provider/e-mail unit in any of a number of ways. For example, the messages may be transferred by sending them in one or more data packets, by using an X.25 communications scheme, by using an X.400 communications scheme, etc.

While embodiments have been described herein, modification of the described embodiments may become apparent to those of ordinary skill in the art, following the teachings of the invention, without departing from the scope of the invention as set forth in the appended claims.

For example, upon receipt of a message at a destination location, header information may be displayed to the operator, indicating whether the received message contains just audio data, just text data, or a combination of the two. The I/O device of the present invention may be implemented on a semiconductor chip.

What is claimed is:

1. An output device for an electronic mail system, comprising:

a receiving unit for receiving a complete message from the electronic mail system, the complete message including a header portion containing information about what is in the complete message;

a decoupling unit connected to the receiving unit for receiving the complete message and decoupling a digitized audio portion, the header portion, and a text portion from the complete message, the complete message including a predetermined bit pattern that is utilized by the decoupling unit to separate the digitized audio portion of the complete message from the text portion of the complete message, the predetermined bit pattern corresponding to a mark in the complete message that indicates a transition point to the decoupling unit for processing of portions of the complete message before and after the transition point;

a first storage unit connected to the decoupling unit for storing the digitized audio portion;

a second storage unit connected to the decoupling unit for storing the text portion;

a converting unit connected to the first storage unit for converting the digitized audio portion to an analog audio portion;

an audio output unit connected to the converting unit for receiving the analog audio portion and broadcasting, in accordance with receipt of a first control signal, audio corresponding to the analog audio portion; and a display unit connected to the second storage unit for displaying, in accordance with receipt of a second control signal, the text portion on a display, wherein the header portion of the complete message is initially an only portion of the complete message that is displayed on the display, wherein the header portion provides information regarding whether the complete message contains text only, digitized audio only, or both text and digitized audio, to thereby allow the user to decide whether or not to open the complete message in its entirety or only particular portions thereof, and wherein, based on user-provided inputs, either or both of the first and second control signals are outputted based on the user-provided inputs so as to output either or both of the text portion and the audio portion of the complete message.

2. An input/output device for an electronic mail system, comprising:

a text input unit;

an audio input unit;

a recording unit connected to the audio input unit for receiving an audio portion of a message from the audio input unit and recording the audio portion;

a digitizing unit connected to the recording unit for digitizing the audio portion;

a first storage unit connected to the digitizing unit for storing the digitized audio portion;

a digital audio input unit connected to the first storage unit for receiving digitized audio data and outputting the digitized audio data to the first storage unit;

a second storage unit connected to the text input unit for storing a text portion of the message from the text input unit;

an audio output unit connected to the first storage unit for outputting in an audible manner digitized audio data from the first storage unit, wherein the first storage unit outputs the digitized audio data in accordance with a first control signal provided thereto;

a text display output unit connected to the second storage unit for outputting onto a display the text portion of the message, wherein the second storage unit outputs the text portion of the message to the text display output unit in accordance with a second control signal provided thereto;

a coupling unit connected to the first and second storage units for receiving the digitized audio portion and the text portion and coupling the digitized audio portion and the text portion into a complete message, the coupling unit further coupling a header portion into the complete message that includes information concerning relative location and size of the audio portion and the text portion within the complete message;

a transmitting unit connected to the coupling unit for transmitting the complete message, wherein the input device provides for updating of one or both of the text portion and the audio portion of the complete message by a user after the user has reviewed at least one of the text portion and the audio portion of the complete message by way of the audio output unit and the text display output unit;

a receiving unit for receiving a complete message from the electronic mail system;

a decoupling unit connected to the receiving unit for receiving the complete message and decoupling a digitized audio portion, the header portion, and the text portion from the complete message, the complete message including a predetermined bit pattern that is utilized by the decoupling unit to separate the digitized audio portion of the complete message from the text portion of the complete message, the predetermined bit pattern corresponding to a mark in the complete message that indicates a transition point to the decoupling unit for processing of portions of the complete message before and after the transition point;

a third storage unit connected to the decoupling unit for storing the digitized audio portion;

a fourth storage unit connected to the decoupling unit for storing the text portion;

a converting unit connected to the third storage unit for converting the digitized audio portion to an analog audio portion;

an audio output unit connected to the converting unit for receiving the analog audio portion and broadcasting, in accordance with receipt of a third control signal, audio corresponding to the analog audio portion; and a display unit connected to the second storage unit for displaying, in accordance with receipt of a fourth control signal, the text portion on a display, wherein the header portion of the complete message is initially an only portion of the complete message that is displayed on the display, wherein the header portion provides information regarding whether the complete message contains text only, digitized audio only, or both text and digitized audio, to thereby allow the user to decide whether or not to open the complete message in its entirety or only particular portions thereof, and wherein, based on user-provided inputs, either or both of the third and fourth control signals are outputted based on the user-provided inputs so as to output either or both of the text portion and the audio portion of the complete message.

3. An electronic mail system, comprising at least two input/output devices, each including:

a text input unit;

an audio input unit;

a recording unit connected to the audio input unit for receiving an audio portion of a message from the audio input unit and recording the audio portion;

a digitizing unit connected to the recording unit for digitizing the audio portion;

a first storage unit connected to the digitizing unit for storing the digitized audio portion;

a digital audio input unit connected to the first storage unit for receiving digitized audio data and outputting the digitized audio data to the first storage unit;

a second storage unit connected to the text input unit for storing a text portion of the message from the text input unit;

an audio output unit connected to the first storage unit for outputting in an audible manner digitized audio data from the first storage unit, wherein the first storage unit outputs the digitized audio data in accordance with a first control signal provided thereto;

a text display output unit connected to the second storage unit for outputting onto a display the text portion of the message, wherein the second storage unit outputs the text portion of the message to the text display output unit in accordance with a second control signal provided thereto; a coupling unit connected to the first and second storage units for receiving the digitized audio portion and the text portion and coupling the digitized audio portion and the text portion into a complete message, the coupling unit further coupling a header portion into the complete message that includes information concerning relative location and size of the audio portion and the text portion within the complete message;

a transmitting unit connected to the coupling unit for transmitting the complete message, wherein the input device provides for updating of one or both of the text portion and the audio portion of the complete message by a user after the user has reviewed at least one of the text portion and the audio portion of the complete message by way of the audio output unit and the text display output unit;

a receiving unit for receiving a complete message from the electronic mail system;

a decoupling unit connected to the receiving unit for receiving the complete message and decoupling a digitized audio portion, the header portion, and the text portion from the complete message, the complete message including a predetermined bit pattern that is utilized by the decoupling unit to separate the digitized audio portion of the complete message from the text portion of the complete message, the predetermined bit pattern corresponding to a mark in the complete message that indicates a transition point to the decoupling unit for processing of portions of the complete message before and after the transition point;

a third storage unit connected to the decoupling unit for storing the digitized audio portion;

a fourth storage unit connected to the decoupling unit for storing the text portion;

a converting unit connected to the third storage unit for converting the digitized audio portion to an analog audio portion;

an audio output unit connected to the converting unit for receiving the analog audio portion and broadcasting, in accordance with receipt of a third control signal, audio corresponding to the analog audio portion; and a display unit connected to the second storage unit for displaying, in accordance with receipt of a fourth control signal, the text portion on a display, wherein the header portion of the complete message is initially an only portion of the complete message that is displayed on the display, wherein the header portion provides information regarding whether the complete message contains text only, digitized audio only, or both text and digitized audio, to thereby allow the user to decide whether or not to open the complete message in its entirety or only particular portions thereof, and wherein, based on user-provided inputs, either or both of the third and fourth control signals are outputted based on the user-provided inputs so as to output either or both of the text portion and the audio portion of the complete message.

* * * * *